(12) United States Patent
Draznin et al.

(10) Patent No.: US 9,749,908 B2
(45) Date of Patent: Aug. 29, 2017

(54) LOCAL BREAKOUT SERVICE

(71) Applicant: Verizon Patent and Licensing Inc., Arlington, VA (US)

(72) Inventors: Sagiv Draznin, Walnut Creek, CA (US); Patricia R. Chang, San Ramon, CA (US); Lalit R. Kotecha, San Ramon, CA (US); Mingxing S. Li, San Jose, CA (US); Arda Aksu, Martinez, CA (US); Donna L. Polehn, Kirkland, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 223 days.

(21) Appl. No.: 14/812,587

(22) Filed: Jul. 29, 2015

(65) Prior Publication Data
US 2017/0034743 A1    Feb. 2, 2017

(51) Int. Cl.
*H04W 4/00* (2009.01)
*H04W 36/00* (2009.01)
*H04W 36/12* (2009.01)
*H04W 8/08* (2009.01)
*H04W 76/04* (2009.01)

(52) U.S. Cl.
CPC ... *H04W 36/0022* (2013.01); *H04W 36/0016* (2013.01); *H04W 36/12* (2013.01); *H04W 8/08* (2013.01); *H04W 76/041* (2013.01)

(58) Field of Classification Search
CPC .............. H04W 36/00; H04W 36/0016; H04W 36/0022; H04W 8/08; H04W 76/02; H04W 76/021

USPC ......................................................... 370/331
See application file for complete search history.

(56) References Cited

U.S. PATENT DOCUMENTS

| | | | | |
|---|---|---|---|---|
| 9,504,012 B1* | 11/2016 | Ljung | ............... | H04W 36/0083 |
| 2012/0039213 A1* | 2/2012 | Cheng | ................ | H04W 76/022 370/254 |
| 2012/0076047 A1* | 3/2012 | Turanyi | ................ | H04W 76/02 370/254 |
| 2012/0182972 A1* | 7/2012 | Guan | .................. | H04W 76/021 370/331 |
| 2012/0207013 A1* | 8/2012 | Kamalaraj | ............ | H04W 8/065 370/218 |
| 2012/0208506 A1* | 8/2012 | Hirano | .................... | H04L 63/08 455/411 |

(Continued)

*Primary Examiner* — Farah Faroul

(57) ABSTRACT

A method, a device, and a non-transitory storage medium provide to store packet data network (PDN) connection data pertaining to a user equipment connected to a network; store locale-to-packet data network gateway (PGW) data, wherein the locale-to-PGW data includes mappings between locales and PGWs to be used when the user equipment is located in the locales; receive a locale update pertaining to the user equipment; query the locale-to-PGW data in response to the locale update; determine, based on a result of the query, whether the user equipment is to be re-anchored to a different PGW than a PGW to which the user equipment is currently anchored; invoke a re-anchoring procedure, in response to a determination that the user equipment is to be re-anchored to the different PGW; and omit to invoke the re-anchoring procedure, in response to a determination that the user equipment is not to be re-anchored.

20 Claims, 17 Drawing Sheets

(56) References Cited

U.S. PATENT DOCUMENTS

| | | | | |
|---|---|---|---|---|
| 2013/0121298 A1* | 5/2013 | Rune | ................ | H04L 29/12066 |
| | | | | 370/329 |
| 2014/0003233 A1* | 1/2014 | Rune | .................... | H04L 47/125 |
| | | | | 370/230 |
| 2014/0126448 A1* | 5/2014 | Punz | ................ | H04W 52/0222 |
| | | | | 370/311 |
| 2014/0192739 A1* | 7/2014 | Liao | ........................ | H04W 8/22 |
| | | | | 370/329 |
| 2014/0321328 A1* | 10/2014 | Zuniga | .................... | H04W 8/06 |
| | | | | 370/254 |
| 2015/0382259 A1* | 12/2015 | Gorey | .................. | H04W 36/04 |
| | | | | 455/444 |
| 2016/0374073 A1* | 12/2016 | Oh | .................... | H04W 72/0413 |
| 2017/0094359 A1* | 3/2017 | Basra | ............... | H04N 21/47202 |
| 2017/0094443 A1* | 3/2017 | Kim | ...................... | H04W 4/005 |
| 2017/0105093 A1* | 4/2017 | Qu | ....................... | H04W 4/021 |

\* cited by examiner

| PDN CONNECTION TABLE 450 | | | | | |
|---|---|---|---|---|---|
| UE ID | CHARGING | SGW | BEARER IDENTITY | SESSION | PGW ID |
|  |  |  |  |  |  |
|  |  |  |  |  |  |
|  |  |  |  |  |  |

RECORD 495

LOCAL BREAKOUT SERVICE

BACKGROUND

Mobile devices offer various services and applications to users, such as a web service, a communication service (e.g., e-mail, short messaging service (SMS), video chat, multimedia messaging service (MMS), voice service, etc.), a media service (e.g., streaming and downloading of music, video, etc.), etc. Mobile devices may access these various services via a wireless network. For example, a mobile device may access a Long Term Evolution (LTE) network to establish a session via a packet data network (PDN) gateway (PGW). The PGW serves as the anchor point for network mobility.

BRIEF DESCRIPTION OF THE DRAWINGS

FIG. 4C is a diagram of an exemplary table that stores exemplary PDN connection data;

DETAILED DESCRIPTION OF PREFERRED EMBODIMENTS

Figure 1:
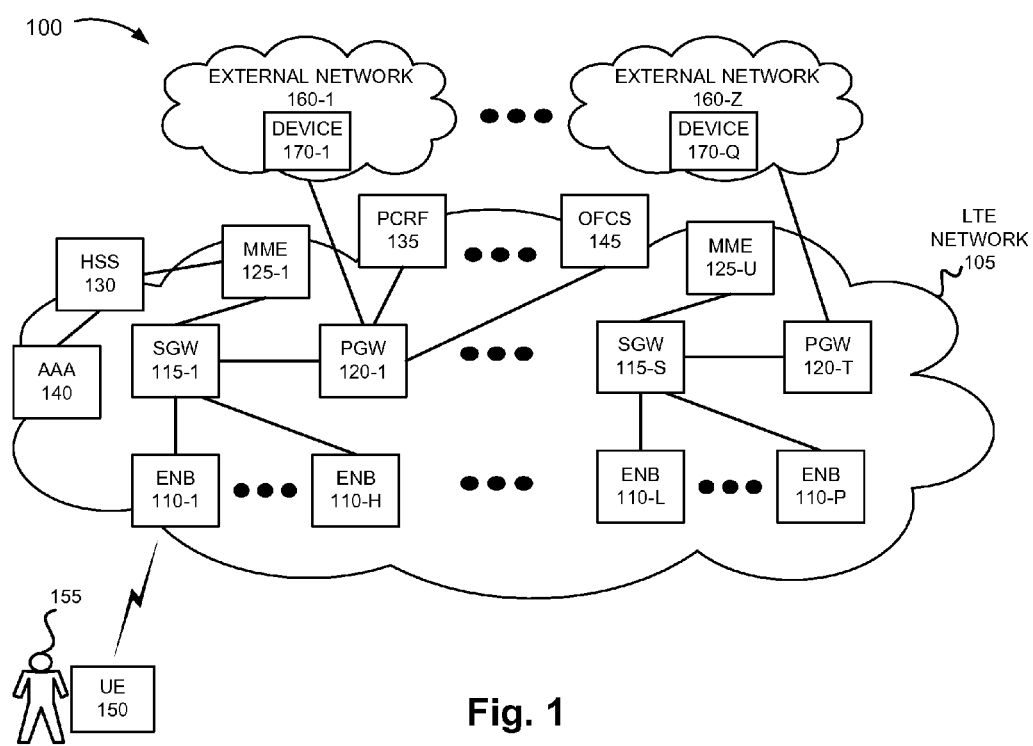
FIG. 1 is a diagram illustrating an exemplary environment in which an exemplary embodiment of a local breakout service may be implemented.

The following detailed description refers to the accompanying drawings. The same reference numbers in different drawings may identify the same or similar elements. Also, the following detailed description does not limit the invention.

In an LTE network, a default bearer is established to a PGW when a user equipment (UE) or other type of end device, such as a machine-type device, etc. (simply referred to herein as "UE") attaches to the LTE network. During an attach procedure or subsequent thereto, a dedicated bearer may also be established for the UE. However, when a user associated with the UE roams, the UE remains anchored to the PGW selected during the attachment procedure. As a result, network resources may be unnecessarily wasted when routing traffic via the PGW instead of another PGW that is closer (e.g., logically or geographically) to the roaming user.

According to an exemplary embodiment, an LTE network provides a local breakout service. According to an exemplary embodiment, a Mobility Management Entity (MME) provides the local breakout service.

According to an exemplary embodiment, the local breakout service includes a lookup procedure. As a part of the lookup procedure, the MME determines whether the UE is to be re-anchored. As described further below, during the lookup procedure, the MME identifies a PGW that the UE should be anchored to in view of the current locale of the UE. When the identified PGW matches the PGW to which the UE is currently anchored or attached, the MME determines that the UE does not need to be re-anchored. When the identified PGW does not match the PGW to which the UE is currently anchored or attached, the MME determines that the UE needs to be re-anchored.

According to an exemplary embodiment, the MME determines whether to invoke the lookup procedure of the local breakout service based on a comparison of the current locale of the UE relative to a subsequent update of the locale of the UE. For example, when the current locale and the updated locale are the same, the MME determines not to invoke the lookup procedure. This may occur when a periodic tracking area update procedure is used. When the current locale and the updated locale are not the same, the MME determines to invoke the lookup procedure. According to other exemplary embodiments, the MME invokes the lookup procedure when an update to the locale of the UE is received.

According to an exemplary embodiment, the MME determines the locale of the UE based on an E-UTRAN Cell Global Identifier (ECGI), which identifies the cell of the UE. According to other exemplary embodiments, other identifiers may be used, in addition to the ECGI or instead of the ECGI, to determine the locale of the UE. For example, a Tracking Area Identity (TAI), a Tracking Area Code (TAC), and/or a Physical Cell Identifier (PCI) may be used. Additionally, or alternatively, identifiers of another network element (e.g., a globally unique identifier (GUID) or a non-GUID) may be used. For example, the GUID may be a Global evolved Node B (eNB) Identifier (Global eNB ID) or an eNB ID (i.e., not globally unique) to which the UE is attached, and/or some other type of wireless node (e.g., a femto device, etc.) to which the UE is attached.

According to an exemplary embodiment, a network element of the LTE network stores data that includes mappings between locales and PGWs (also referred to herein as "locale-to-PGW data"). According to an exemplary embodiment, the MME uses the locale-to-PGW data to perform the lookup procedure, when the lookup procedure is invoked.

According to an exemplary implementation, the MME stores the mappings between locales and PGWs. According to another exemplary implementation, a network element other than the MME stores the mappings between locales and PGWs. For example, an Internet Domain Name System (IDNS) device may store the mappings between locales and PGWs. Alternatively, the network element may be implemented as another type of device (e.g., a Policy and Charging Rules Function (PCRF), a database management system (DMS), etc.), which is communicatively coupled to the MME.

The network element may be implemented in a centralized or a distributed fashion. The MME may access, query, or request locale-to-PGW data stored by the network element when the lookup procedure is invoked. Depending on the network element implemented, the MME may or may not require a new or a modified interface. As described further below, the locale-to-PGW data includes locale data (e.g., ECGIs and/or other types of identifiers (e.g., TAI, etc.)) that are mapped to PGW identifiers. According to an exemplary implementation, the PGW identifiers are Globally Unique PGW Identifiers (GUPGWIDs). Additionally, or alternatively, the PGW identifiers may be a network address (e.g., an Internet Protocol (IP) address), a name or a string (e.g., an Access Point Name-Fully Qualified Domain Name (APN FQDN) etc.)). According to other implementations, the PGW identifiers may be identifiers of a pool of PGWs or a list of candidate PGWs.

As previously described, according to an exemplary embodiment, based on a result of the lookup procedure, the MME determines whether the UE needs to re-anchored. For example, assume that the UE is in an area defined as ECGI-1 and the UE is anchored to a PGW-2. When the locale-to-PGW data indicates a UE in ECGI-1 is to be anchored to PGW-1, the MME will determine that a re-anchoring procedure of the local breakout service is to be invoked. On the other hand, when the locale-to-PGW data indicates a UE in ECGI-1 is to be anchored to PGW-2, the MME will determine that the re-anchoring procedure of the local breakout service is not to be invoked.

According to an exemplary embodiment, the local breakout service includes a re-anchoring procedure. The MME performs the re-anchoring procedure when it is determined that the UE is to be re-anchored. As described further below, the MME re-anchors the UE from the PGW to which the UE is currently attached (also referred to as a "source PGW") to the identified PGW (also referred to as a "target PGW").

According to an exemplary embodiment, when the MME determines that the re-anchoring procedure of the local breakout service is to be invoked, the MME selects a target PGW for re-anchoring the UE. According to an exemplary embodiment, the MME selects the PGW to serve as the target PGW based on the mapping (e.g., a selected locale-to-PGW mapping) stored in the data structure or the database. Depending on the architecture of the PGWs in the LTE network (e.g., centralized or distributed), the MME may have one or multiple PGWs from which to select as the target PGW.

The re-anchoring of the UE from the source PGW to the target PGW may involve one or multiple bearers of one or multiple types (e.g., default, dedicated). Additionally, during any time window, the bearer may or may not have packets in flight. For example, a particular session may undergo transitions between active and idle, and vice versa. The session may be of a particular type (e.g., a real-time session, a non-real time session, etc.). Also, the UE is in a particular state and may undergo a transition between states. For example, according to an LTE specification, the MME receives various state data pertaining to Evolved Packet System (EPS) Mobility Management (EMM), EPS Session Management (ESM), and Radio Resource Control (RRC).

According to an exemplary embodiment, when the UE is connected to a source PGW via a default bearer, and the MME has selected the target PGW for re-anchoring, the MME establishes a new bearer. For example, the MME transmits a create session request to the target PGW on behalf of the UE, which subsequently results in a new PDN connection being established. The MME may also tears down the old default bearer between the UE and the source PGW. For example, the MME transmits a delete session request to the source PGW.

According to an exemplary embodiment, when the UE is connected to a source PGW via a dedicated bearer, the MME determines whether there are packets in flight. For example, the MME determines that there are no packets in flight based on the state data. By way of example, the MME determines there are no packets in flight when the UE is in an EMM Registered, ECM idle, and RRC idle state.

According to an exemplary embodiment, in response to determining that there are no packets in flight via the dedicated bearer, the MME establishes a new bearer via the target PGW, in a manner previously described. Additionally, the MME may also tear down the dedicated bearer between the UE and the source PGW.

According to an exemplary embodiment, when the MME determines that there are packets in flight via the dedicated bearer, the MME will suspend re-anchoring. For example, the MME determines that there are packets in flight based on state data. By way of example, the MME determines that there are packets in flight when the UE is in an EMM registered, ECM connected, and RRC connected state. According to an exemplary implementation, the MME waits a pre-configured time period after determining there are packets in flight before determining whether there are still packets in flight. The MME may continuously perform this check-again-later process until an opportunity arises to re-anchor the UE to the target PGW. Additionally, or alternatively, whenever the MME receives an update to state data pertaining to the UE, the MME determines whether the UE can be re-anchored. Additionally, or alternatively, the MME may wait to receive a particular message before determining that there are no longer packets in flight. For example, a Voice-over LTE (VoLTE) session includes the use of a dedicated bearer. When the VoLTE session is terminated by a user (e.g., the user hangs up), the PGW may transmit a delete bearer request to a serving gateway (SGW), which in turn is transmitted by the SGW to the MME. The delete bearer request is designed to tear down the dedicated bearer of the VoLTE session. According to such an exemplary teardown procedure, the MME may be configured to wait to receive a particular message (e.g., a delete bearer request) pertaining to the dedicated bearer. When the delete bearer request is received, the MME determines that there are no longer packets in flight.

In response to determining that there are no longer packets in flight via the dedicated bearer, the MME establishes a new bearer (e.g., a default bearer) via the target PGW, in a manner previously described. Additionally, the MME also facilitates, in response to receiving the delete bearer request, the teardown of the dedicated bearer between the UE and the source PGW. For example, the MME may transmit an Evolved-Universal Terrestrial Radio Access Network (E-UTRAN) Radio Access Bearer (E-RAB) release message to an evolved Node B (eNB).

According to other exemplary embodiments, the local breakout service permits the UE to use multiple PGWs without re-anchoring. For example, assume that a roaming user establishes, via a UE, a web session while anchored to a source PGW. Thereafter, the roaming user initiates, via the UE, a Voice over LTE (VoLTE) call. In a manner similar to that previously described, the MME determines that the user has roamed into a locale that can be served by a PGW that is different from the source PGW servicing the web session, in which the different PGW provides a reduced PGW-to-UE path compared to the PGW-to-UE path associated with the source PGW. According to an exemplary embodiment, the local breakout service provides that the UE maintain the web session via the source PGW and coordinates the VoLTE call via the different PGW. According to yet other embodiments, the local breakout service provides that the UE switch the web session to the different PGW. For example, the switch may be performed during an idle period of the web session, as previously described.

FIG. 1 is a diagram illustrating an exemplary environment 100 in which an exemplary embodiment of a local breakout service may be implemented. As illustrated, environment 100 includes an LTE network 105 that includes evolved Node Bs (eNBs) 110-1 through 110-P (also referred to collectively as eNBs 110 or generally as eNB 110), serving gateways (SGWs) 115-1 through 115-S (also referred to collectively as SGWs 115 or generally as SGW 115), PGWs 120-1 through PGW 120-T (also referred to collectively as PGWs 120 or generally as PGW 120), MMEs 125-1 through MME 125-U (also referred to collectively as MMEs 125 or generally as MME 125), an HSS 130, a policy charging and rules function (PCRF) 135, an authentication, authorization, and accounting (AAA) server 140, and an offline charging system (OFCS) 145. Environment 100 also illustrates a UE 150 and a user 155. Additionally, environment 100 also includes external networks 160-1 through 160-Z (also referred to collectively as external networks 160 or generally as external network 160), which include devices 170-1 through 170-Q (also referred to collectively as devices 170 or generally as device 170).

Environment 100 may be implemented to include wired, optical, and/or wireless connections among the devices and the networks illustrated. A connection may be direct or indirect and may involve an intermediary device not illustrated in FIG. 1. For example, environment 100 may include a femto device, a pico device, a home eNB, a Node B, a serving GPRS support node (SGSN), a gateway GPRS support node (GGSN), etc. Additionally, or alternatively, a connection may involve an intermediary network not illustrated in FIG. 1. For example, environment 100 may include an internetworking between LTE network 105 and another network (e.g., a 2G network, a 2.5G network, a 3G network, a 3.5G network, etc.). Additionally, the number, type (e.g., wired, wireless, etc.), and the arrangement of connections between the devices and the networks are exemplary. For example, although not illustrated, there are connections between MME 125 and eNB 110, as provided by the LTE standard.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. Additionally, or alternatively, environment 100 may include an additional network and/or differently arranged networks, than those illustrated in FIG. 1. Also, according to other embodiments, one or more functions and/or processes described as being performed by a particular device may be performed by a different device, or some combination of devices.

LTE network 105 includes a network defined by a Third Generation Partnership Project (3GPP) specification or according to an LTE architecture and standard. For example, the network elements of LTE network 105, such as for example, eNB 110, SGW 115, PGW 120, and MME 125, may each operate according to the LTE specification or standard. Additionally, although environment 100 includes LTE network 105, according to other embodiments, LTE network 105 may be implemented as an LTE Advanced network or a future generation wireless network architecture.

According to an exemplary embodiment, LTE network 105 provides a local breakout service, as described herein. As previously described, according to an exemplary implementation, the local breakout service is network-side initiated. According an exemplary embodiment, MME 125 includes a function or operates in a manner that supports the local breakout service in cooperation with other network elements of LTE network 105, as described herein. For example, MME 125 includes a session and mobility management function that provides the local breakout service. MME 125 is described further below.

HSS 130 stores user subscription or user profile data. HSS 130 may also perform other services (e.g., authentication, authorization, etc.). PCRF 135 includes a device that determines charging polices for packets, enforces minimum quality-of-service (QoS) parameters, provides QoS information to PGW 120, and dynamically manages and controls data sessions.

AAA 140 includes a device that provides authentication, authorization, and accounting services. OFCS 145 includes a device that provides an off-line charging service that includes the generation of charging data records (CDRs) for the billing system.

UE 150 includes a device that connects to LTE network 105. For example, UE 150 may include a mobile device or a non-mobile device. For example, UE 150 may be implemented as a smartphone, a personal digital assistant, a tablet, a netbook, an infotainment system or other system in a vehicle, or a wearable device (e.g., a watch, glasses, etc.). Alternatively, UE 150 may be implemented as a non-mobile or stationary device, such as a kiosk, a point of sale terminal, a vending machine, a set top box, or a type of machine-to-machine (M2M) device (e.g., a meter device, a smart device, a security device, etc.).

External network 160 includes one or multiple networks of one or multiple types. For example, external network 160 may be implemented as a service or application-layer network, the Internet, an Internet Protocol Multimedia Subsystem (IMS) network, a proprietary network, a cloud network, a data network, etc. Device 170 may include a network device that provides an application or service, such as a web server, a communication server (e.g., e-mail, Short Messaging Service, Multimedia Messaging Service, video telephony, Voice over Internet Protocol (VoIP), VoLTE, a navigation service, a media streaming service, etc.

As previously described, according to an exemplary embodiment, MME 125 provides the local breakout service in cooperation with other network elements of LTE network 105. According to one exemplary embodiment, when UE 150 initially attaches to LTE network 105, MME 125 identifies whether UE 150 is a mobile device. For example, according to an exemplary implementation, MME 125 obtains data from HSS 130 during an authentication procedure of UE 150 when UE 150 attempts to attach to LTE network 105. As an example, HSS 130 may store subscription data that includes UE characteristic data (also known as device profile data). The UE characteristic data may include data that indicates whether UE 150 is a mobile device. Based on the receiving of the UE characteristic data, MME 125 determines whether UE 150 is a mobile device. When MME 125 identifies that UE 150 is a mobile device, MME 125 invokes the lookup procedure of the local breakout service when the location of UE 150 changes. When MME 125 identifies that UE 150 is not a mobile device, MME 125 determines that the local breakout service is not necessary for this UE 150.

According to other embodiments, MME 125 may not identify or determine whether UE 150 is a mobile device. Rather, MME 125 may simply perform the local breakout service, as described herein. For purposes of the remainder of this description, assume that UE 150 is a mobile device.

MME 125 tracks and stores locale data pertaining to UE 150. For example, when UE 150 initially camps on a cell, MME 125 stores the locale of UE 150. For example, MME 125 may store an identifier (an ECGI, a TAI, etc.), as previously described, which indicates the current locale of UE 150. Thereafter, MME 125 may obtain updates to the current location of UE 150 from messaging that occurs in accordance with an LTE specification, such as during a tracking area update (TAU) procedure, a handover procedure, etc.

Since, according to the LTE specification, MME 125 selects PGW 120 to which UE 150 is to be anchored, MME 125 obtains an identifier of PGW 120. For example, MME 125 may perform a Straightforward-Naming Authority Pointer (S-NAPTR) procedure. As a result of the PGW selection process, MME 125 stores the PGW identifier. For example, as described further below, MME 125 stores PDN connection data that includes a PGW identifier to which UE 150 is attached. As previously described, the PGW identifier may be a GUPGWID, a network address, a name or a string, etc.

According to one exemplary embodiment, the MME invokes the lookup procedure when an update to the locale of the UE is received (e.g., based on a tracking area update procedure, etc.). According to another exemplary embodiment, MME 125 determines whether to invoke the lookup procedure of the local breakout service based on a comparison of the current locale of UE 150 relative to a subsequent update of the locale of UE 150, which may be received. According to an exemplary embodiment, MME 125 stores UE context data that includes data indicating a current (or last known) locale of UE 150. The UE context data may be stored in a database or a data structure. Described below is an exemplary table that stores locale data.

Figure 4A:
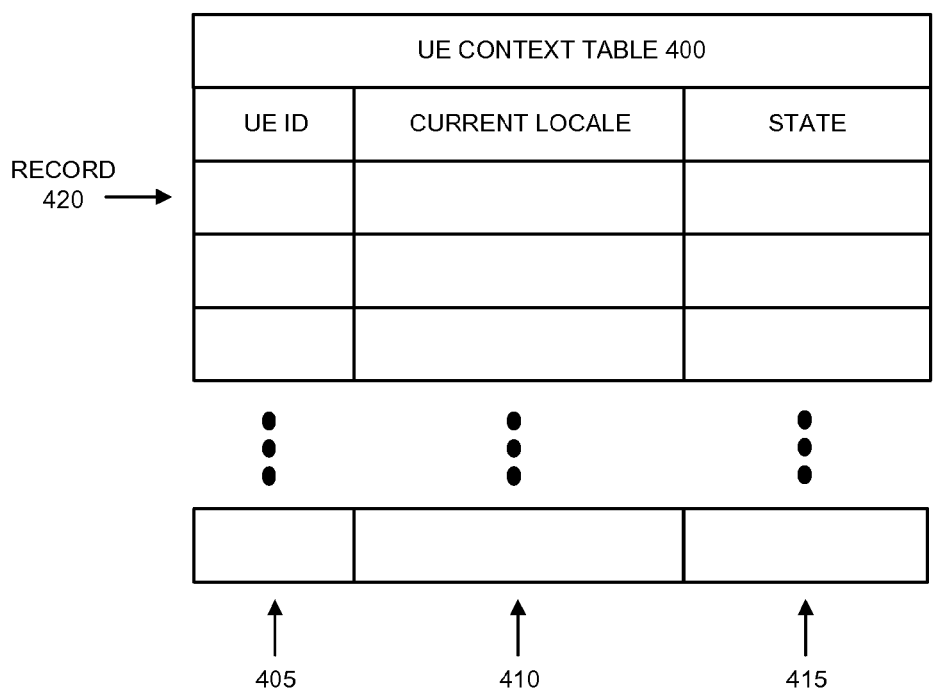
FIG. 4A is a diagram of an exemplary table that stores exemplary user equipment (UE) context data.

FIG. 4A is a diagram of an exemplary UE context table 400 that stores exemplary UE context data. As illustrated, UE context table 400 includes a UE ID field 405, a current locale field 410, and a state field 415.

UE ID field 405 stores data that identifies a user and/or a UE. For example, UE ID field 455 may store an IMSI, a network address (e.g., an IP addressed assigned to UE 150, a Media Access Control (MAC) address, etc.), an equipment identifier (e.g., a Mobile Equipment Identifier (MEID), an International Mobile Equipment Identity (IMEI), an Electronic Serial Number (ESN), etc.), a temporary identifier (e.g., a Temporary Mobile Subscriber Identity (TMSI), a Globally Unique Temporary ID (GUTI), etc.), a MSISDN, an IMS private user identity (IMPI), an IMS public user identity (IMPU), and/or the like.

Current locale field 410 stores data that indicates a locale of UE 150. For example, current locale field 410 may store an ECGI, aTAI, a TAC, and/or a PCI. Additionally, or alternatively, identifiers of another network element (e.g., a globally unique identifier (GUID) or a non-GUID) may be used.

State field 415 stores data that indicates a state of UE 150. For example, state field 415 stores data pertaining to various states of EMM, ESM, and RRC, in accordance with the LTE specification. A record 420 of UE context table 400 indicates a mapping or correlation between the data stored in UE ID field 405, current locale field 410, and state field 415.

Although FIG. 4A illustrates an exemplary UE context table 400, according to other embodiments, UE context table 400 may include additional fields or different fields than those illustrated and described. Indeed, MME 125 typically stores various types of data pertaining to UE 150. For example, MME 125 may store a tracking area list, access restriction subscription data, charging characteristic data, the Internet Protocol (IP) address of the eNB used by UE 150, non-access stratum (NAS) keys, etc., the details of which goes beyond the scope of this disclosure.

Assume that MME 125 stores a locale of UE 150 in field 410 of UE context table 400 during an attachment procedure. Thereafter, UE 150 transmits a TAU request, which carries data that indicates a new locale, to MME 125. MME 125 stores the new locale in field 410. Additionally, in response receiving the updated locale, MME 125 invokes the lookup procedure of the local breakout service.

According to another exemplary embodiment, MME 125 determines whether to invoke the lookup procedure of the local breakout service based on a comparison of the current locale of UE 150 stored in field 410 relative to a subsequent update of the locale of UE 150. For example, when a periodic tracking area update (TAU) procedure is used, UE 150 may transmit a TAU request based on a TAU timer, regardless of whether UE 150 has changed locale. According to such an embodiment, when MME 125 receives the TAU request that includes data indicating a locale, MME 125 compares the updated locale to the locale stored in field 410. When the locales do not match, MME 125 invokes the lookup procedure of the local breakout service and stores the updated locale in field 410. When the locales match, MME 125 does not invoke the lookup procedure. MME 125 may overwrite the current locale with the updated locale in field 410 even when the locales are the same. For example, field 410 may also store timestamp data.

According to an exemplary embodiment, MME 125 performs the lookup procedure via a database (e.g., a relational, etc.) or a data structure (e.g., a table, a list, etc.) to determine whether to invoke the re-anchoring procedure of the local breakout service. The database or the data structure stores locale-to-PGW data. According to an exemplary embodiment, MME 125 stores the locale-to-PGW data. According to another exemplary embodiment, MME 125 does not store the locale-to-PGW data. Rather, as previously described, the locale-to-PGW data is stored by another network element (e.g., an IDNS device, a PCRF, a database management system device, a server device, etc.). MME 125 performs a lookup procedure (e.g., accesses, queries, and/or requests) of locale-to-PGW data to determine whether a re-anchoring is to be performed.

Figure 4B:
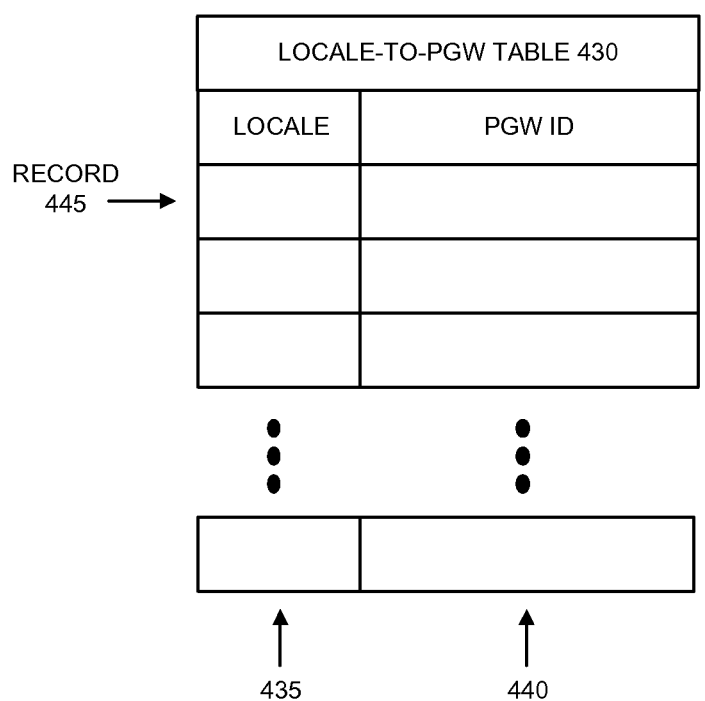
FIG. 4B is a diagram of an exemplary table that stores exemplary locale-to-PGW data.

FIG. 4B is a diagram of an exemplary locale-to-PGW table 430. Locale-to-PGW table 430 stores locale-to-PGW data. As illustrated, locale-to-PGW table 430 includes a locale field 405 and a PGW identifier field 440. Locale field 435 stores data that indicates a location. For example, locale field 435 may store an ECGI, a TAI, and/or another type of identifier (e.g., a PCI, etc.), as previously described, which indicates a locale. PGW identifier field 440 stores data that identifies a PGW. For example, PGW identifier field 440 may store a GUPGWID, a network address, a name, etc., as previously described, which identifies a PGW. A record 445 of locale-to-PGW table 430 indicates a mapping or correlation between the data stored in locale field 435 and PGW ID field 440.

Although FIG. 4B illustrates an exemplary locale-to-PGW table 430, according to other embodiments, locale-to-PGW table 430 may include additional fields or different fields than those illustrated and described. For example, a locale-to-PGW table may store a service parameters field. The service parameters field stores data indicating a service, a protocol, etc., afforded via or by the PGW identified by PGW identifier field 440.

According to an exemplary embodiment, when MME 125 performs the lookup procedure, MME 125 uses the locale data stored in field 410 of UE context table 400 as a key to locale-to-PGW table 430 to determine a corresponding PGW. When MME 125 does not store locale-to-PGW table 430, MME 125 generates and transmits a request to the network element that stores locale-to-PGW table 430. The request includes the locale data stored in field 410. The network element performs a search of table 430 based on the locale data included in the request. As a result of the search, the network element obtains one or multiple PGW identifiers that are mapped to the locale data. The network element generates and transmits a response to MME 125. The response includes the one or multiple PGW identifiers.

MME 125 compares the PGW identifier of PGW ID field 440, which is mapped or correlated to a locale of locale field 435, to another PGW identifier that indicates a PGW 120 to which UE 150 is attached. As described further below, MME 125 stores PDN connection data that includes a PGW identifier to which UE 150 is currently attached. Based on the comparison, MME 125 determines whether UE 150 is to be re-anchored. For example, when the PGW identifier of PGW ID field 440 matches the PGW identifier of the PGW to which UE 150 is currently attached, MME 125 determines that UE 150 does not need to be re-anchored. Conversely, when the PGW identifier of PGW ID field 440 does not match the PGW identifier of the PGW to which UE 150 is currently attached, MME 125 determines that UE 150 needs to be re-anchored.

According to an exemplary embodiment, MME 125 stores PDN connection data that includes a PGW identifier of PGW 120 to which UE 150 is attached. The PDN connection data may be stored in a database or a data structure. FIG. 4C is a diagram of an exemplary PDN connection table 450. As illustrated, PDN connection table 450 includes a UE Identifier (ID) field 455, a charging field 460, an SGW field 465, a bearer identity field 470, a session field 475, and a PGW ID field 480.

UE ID field 455 stores data that identifies a user and/or a UE. For example, UE ID field 455 may store an IMSI, a network address (e.g., an IP addressed assigned to UE 150, a Media Access Control (MAC) address, etc.), an equipment identifier (e.g., a Mobile Equipment Identifier (MEID), an International Mobile Equipment Identity (IMEI), an Electronic Serial Number (ESN), etc.), a temporary identifier (e.g., a Temporary Mobile Subscriber Identity (TMSI), a Globally Unique Temporary ID (GUTI), etc.), a MSISDN, an IMS private user identity (IMPI), an IMS public user identity (IMPU), and/or the like.

Charging field 460 stores charging records generated by SGW and PGW. SGW field 465 stores a network address (e.g., an IP address) of the SGW. SGW field 465 may also store a tunnel endpoint identifier of the SGW for the S1-U interface.

Bearer identity field 470 stores data pertaining to bearers. For example, bearer identity field 470 may store an Evolved Packet System (EPS) Bearer ID, a Linked EPS Bearer ID, the type of bearer (e.g., dedicated, etc.), etc.

Session field 475 stores data pertaining to a session. For example, session field 475 may store a traffic flow template (TFT), QoS parameters (e.g., QoS Class Identifier (QCI), Allocation and Retention Policy (ARP), APN-Aggregate Maximum Bit Rate, Guaranteed Bit Rate (GBR), Maximum Bit Rate (MBR), etc.), a PDN ID (e.g., an APN), the type of session (e.g., real-time, non-real-time, web session, etc.) etc.

PGW ID field 480 stores data that identifies a PGW UE 150 to which UE 150 is connected or anchored. For example, PGW ID field 480 may store a PGW ID. The PGW ID may be globally unique. PGW ID field 480 may store an IP address of the PGW. MME 125 interprets a record 495 in PDN connection table 430 as the mapped or correlated data included in fields 455 through 480.

Although FIG. 4C illustrates an exemplary PDN connection table 450, according to other embodiments, PDN connection table 450 may include fewer field, additional fields, and/or different fields than those illustrated and described. Additionally, while FIGS. 4A-4C are illustrated and described as separate tables, according to other implementations, the data stored by tables 400, 430, and/or 450 may be combined. Additionally, the data illustrated and described in relation to tables 400, 430, and/or 450 may be implemented in a different type of data structure or a database.

As previously described, when the PGW of PGW ID field 440 of locale-to-PGW table 430 matches the PGW of PGW ID field 480 of PDN connection table 450, MME 125 determines not to re-anchor UE 150. Conversely, when the PGW of PGW ID field 440 of locale-to-PGW table 430 does not match the PGW of PGW ID field 480 of PDN connection table 450, MME 125 determines to re-anchor UE 150.

According to an exemplary embodiment, in response to determining to re-anchor UE 150, MME 125 invokes the re-anchoring procedure. As a part of the re-anchoring procedure, MME 125 selects a target PGW to re-anchor UE 150. When PGW ID field 480 indicates a single PGW, MME 125 selects that PGW as the target PGW. When PGW ID field 480 indicates multiple PGWs, MME 125 may select the target PGW in accordance with procedures of the LTE specification and/or the network operator.

As previously described, the re-anchoring of UE 150 may involve one or multiple bearers of one or multiple types (e.g., default, dedicated), as well as various session types (e.g., real-time, non-real time), various UE states, etc. MME 125 may determine the number of bearers, the type of bearers, etc., based on records pertaining to UE 150, which may be stored by MME 125. For example, PDN connection table 450 may allow MME 125 to determine the number of bearers, the type of bearers, and the type of session associated with UE 150. Additionally, as previously described, MME 125 stores state data (e.g., EMM, ESM, RRC).

According to an exemplary embodiment, when UE 150 is connected to a default bearer, MME 125 initiates the establishment of a new bearer between the target PGW and UE 150. For example, MME 125 transmits a create session request to the target PGW. MME 125 also tears down the old default bearer between UE 150 and the source PGW. For example, MME 125 transmits a delete session request to the source PGW. According to an exemplary implementation, MME 125 transmits the delete session request regardless of whether there are packets in flight via the old default bearer (e.g., UE 150 may be in an EMM registered, ECM connected, and RRC connected state). According to another exemplary implementation, MME 125 transmits the delete session request when there are no packets in flight (e.g., UE 150 is in an EMM Registered, ECM idle, and RRC idle state)

According to an exemplary embodiment, when UE 150 is connected to a dedicated bearer, MME 125 determines whether there are packets in flight based on the state data. For example, MME 125 determines that there are no packets in flight when the state data indicates that UE 150 is in an EMM Registered, ECM idle, and RRC idle state. MME 125 determines that there are packets in flight when the state data indicates that UE 150 is in an EMM Registered, ECM connected, and RRC connected state. MME 125 initiates the establishment of a new bearer with the target PGW when there are no packets in flight. When MME 125 determines that there are packets in flight, MME 125 waits for an opportunity to re-anchor UE 150. For example, MME 125 may wait a pre-configured time period or back-off time period before checking the state data pertaining to UE 150. MME 125 may continuously perform this check-again-later process until an opportunity arises to re-anchor UE 150 with the target PGW. Additionally, or alternatively, whenever MME 125 receives an update to state data pertaining to UE 150, MME 125 determines whether UE 150 can be re-anchored. During this waiting period, MME 125 still invokes the lookup procedure in a manner as previously described, in view of the mobility of UE 150, which may result in selecting a different target PGW. When the opportunity arises, MME 125 initiates the establishment of a new bearer between the target PGW and UE 150. MME 125 tears down the dedicated bearer between the source PGW and UE 150.

Described below are exemplary scenarios pertaining to exemplary embodiments of the local breakout service. For the sake of clarity and brevity, the diagrams omit particular network elements, which are a part of LTE network 105, and external network 160 and device 170.

FIGS. 2A-2E are diagrams illustrating an exemplary scenario pertaining to the local breakout service. According to this example, assume that MME 125 manages UE 150, and that MME 125 is connected to a source SGW 115-1 and a target SGW 115-2. Also assume that SGW 115-1 is connected to a source PGW 120-1, and SGW 115-2 is connected to a target PGW 120-2. According to other implementations, the number of network elements of LTE network 105 and connections may be different. For example, SGW 115-2 may be omitted and SGW 115-1 may connect to both source PGW 120-1 and target PGW 120-2.

Figure 2A:
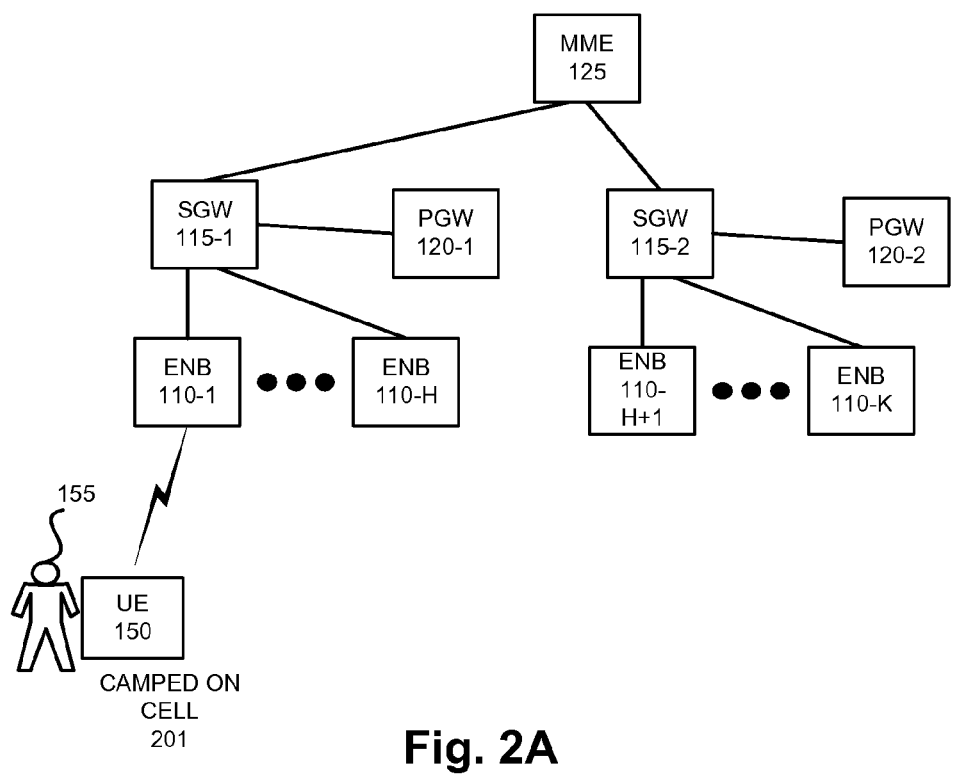
FIGS. 2A-2J are diagrams illustrating an exemplary embodiment of the local breakout service.
Figure 2B:
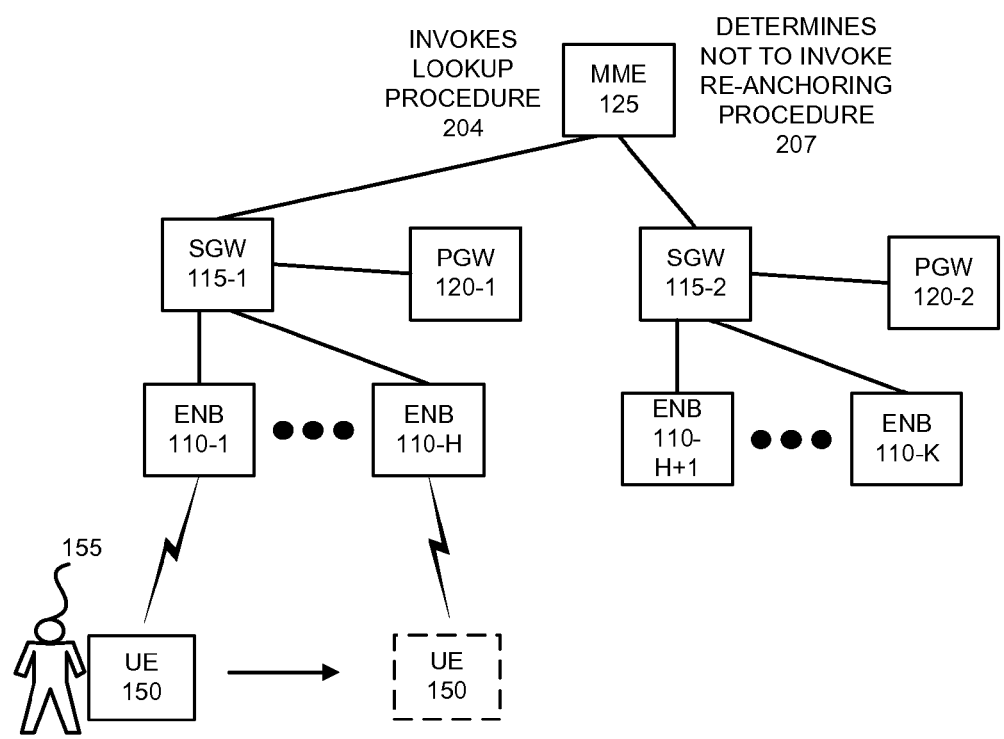

Referring to FIG. 2A, according to an exemplary scenario, assume UE 150 camps on a cell of eNB 110-1 and is anchored to PGW 120-1. During the attachment procedure, a default bearer is established. Referring to FIG. 2B, assume user 155 is taking a trip and establishes a session with a server device (not illustrated) via PGW 120-1 to provide driving directions. As illustrated, user 155 and UE 150 travel through various locations to reach a cell serviced by eNB 110-H. As user 155/UE 150 travel, MME 125 receives a location update based on a TAU procedure. Since the current locale is different than the updated locale, MME 125 invokes a lookup procedure 204. MME 125 queries locale-to-PGW table 430. However, as a result of the lookup procedure 204, MME 125 determines not to invoke a re-anchoring procedure 207. For example, the PGW identifier stored in PGW ID field 480 of PDN connection table 450 matches the PGW identifier stored in PGW ID field 440 of locale-to-PGW table 430.

Figure 2C:
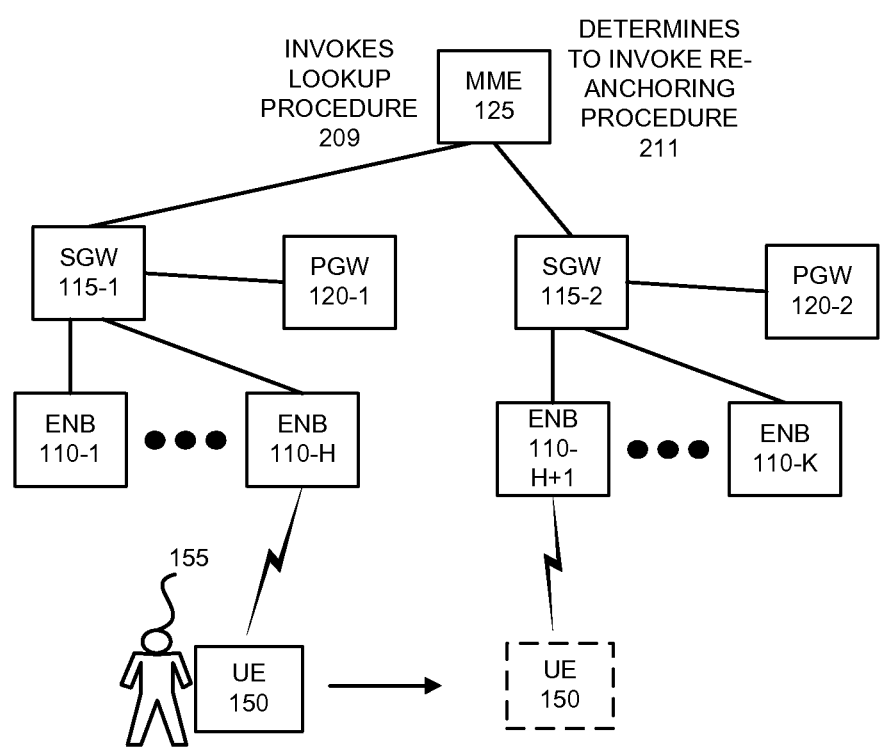

Referring to FIG. 2C, user 155/UE 150 continue to travel. UE 150 establishes a radio connection with eNB 110-H+1. Also assume that MME 125 receives a location update, which causes MME 125 to invoke a lookup procedure 209. MME 125 queries locale-to-PGW table 430. As a result of the lookup procedure 209, MME 125 determines to invoke a re-anchoring procedure 211 based on a comparison of PGW ID field 480 of PDN connection table 450 with PGW ID field 440 of locale-to-PGW table 430. For example, MME 125 selects PGW 120-2 as the target PGW.

Figure 2D:
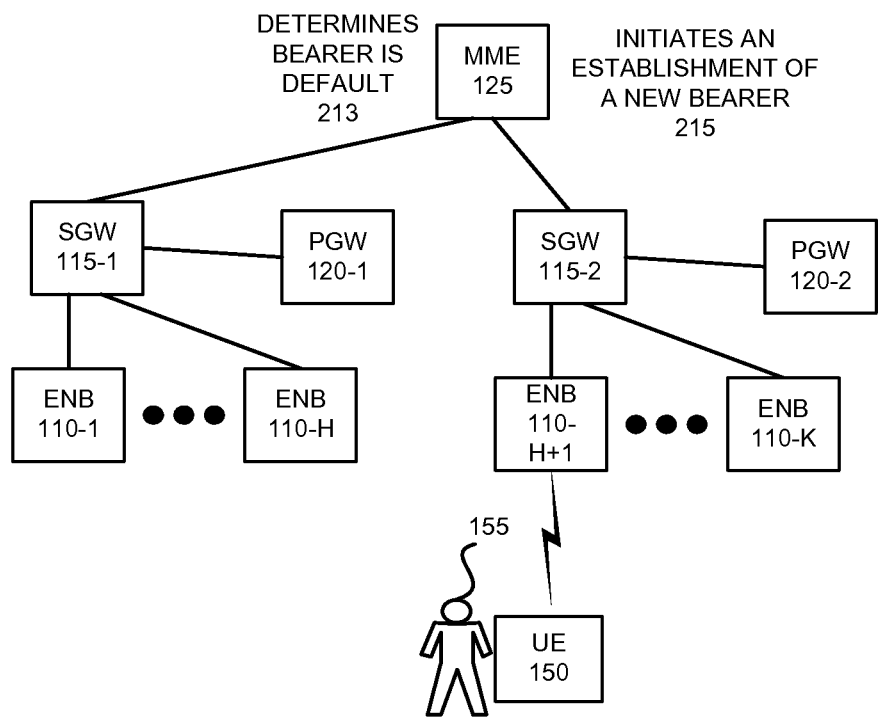
Figure 2E:
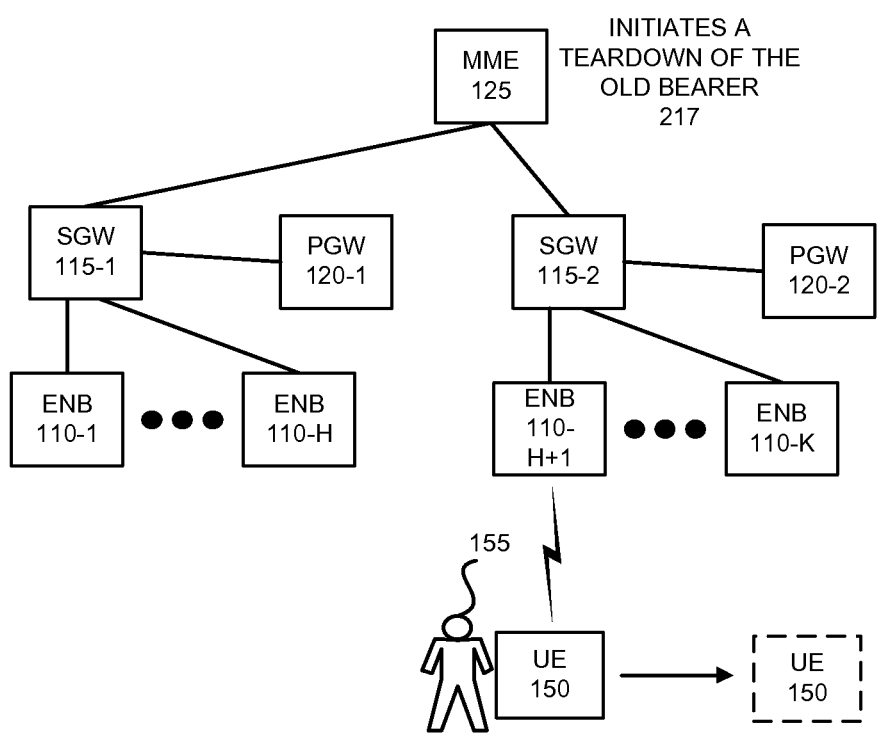

Referring to FIG. 2D, MME 125 determines that the current bearer is a default bearer 213 based on bearer identity field 470 of PDN connection table 450. MME 125 initiates an establishment of a new default bearer 215 between UE 150 and PGW 120-2. For example, MME 125 transmits a create session request to PGW 120-2 via SGW 115-2. Referring to FIG. 2E, MME 125 initiates a teardown of the old default bearer 217 between UE 150 and PGW 120-1. For example, MME 125 transmits a delete session request to PGW 120-1 via SGW-115-2. According to an exemplary implementation, MME 125 transmits the delete session request regardless of whether there are packets in flight (e.g., UE 150 may be in an EMM registered, ECM connected, and RRC connected state). According to another exemplary implementation, MME 125 transmits the delete session request when there are no packets in flight (e.g., UE 150 is in an EMM Registered, ECM idle, and RRC idle state). Subsequent to the teardown of the old default bearer, UE 150 initiates a new session via the new default bearer. User 155/UE 150 continue to travel towards the destination.

Figure 2F:
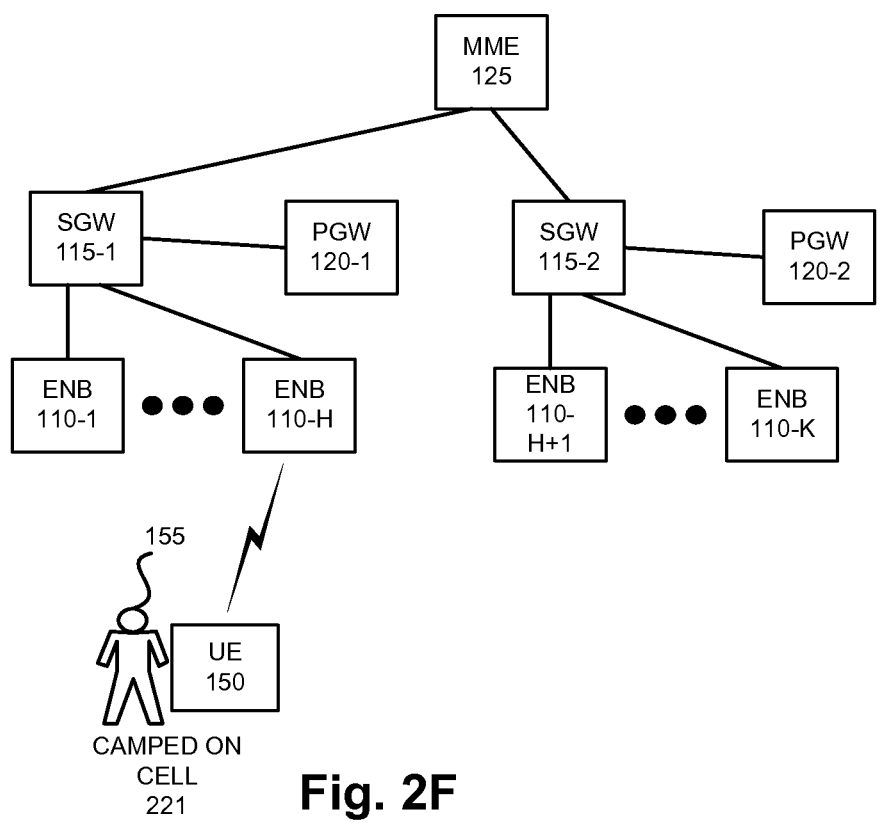

FIGS. 2F-2J are diagrams illustrating another exemplary scenario pertaining to the local breakout service. Referring to FIG. 2F, assume UE 150 establishes a Voice-over LTE (VoLTE) session while camped on a cell of eNB 110-H. During the establishment of the VoLTE session, a signaling bearer (e.g., a default bearer) is established and a voice bearer (e.g., a dedicated bearer) is established in support of the VoLTE session via PGW 120-1. MME 125 obtains bearer identifiers pertaining to the VoLTE session. For example, when the VoLTE session is established via an Internet Protocol Multimedia Subsystem (IMS) network, MME 125 obtains a bearer identity for the default bearer, which is used to carry IMS signaling, a dedicated bearer identity for the dedicated bearer, a linked bearer identity, which links the default and dedicated bearers, and other parameters pertaining to the VoLTE session (e.g., a traffic flow template, Quality of Service (QoS) parameters, an Access Point Name (APN), etc.). MME 125 stores this data in PDN connection table 450.

Figure 2G:
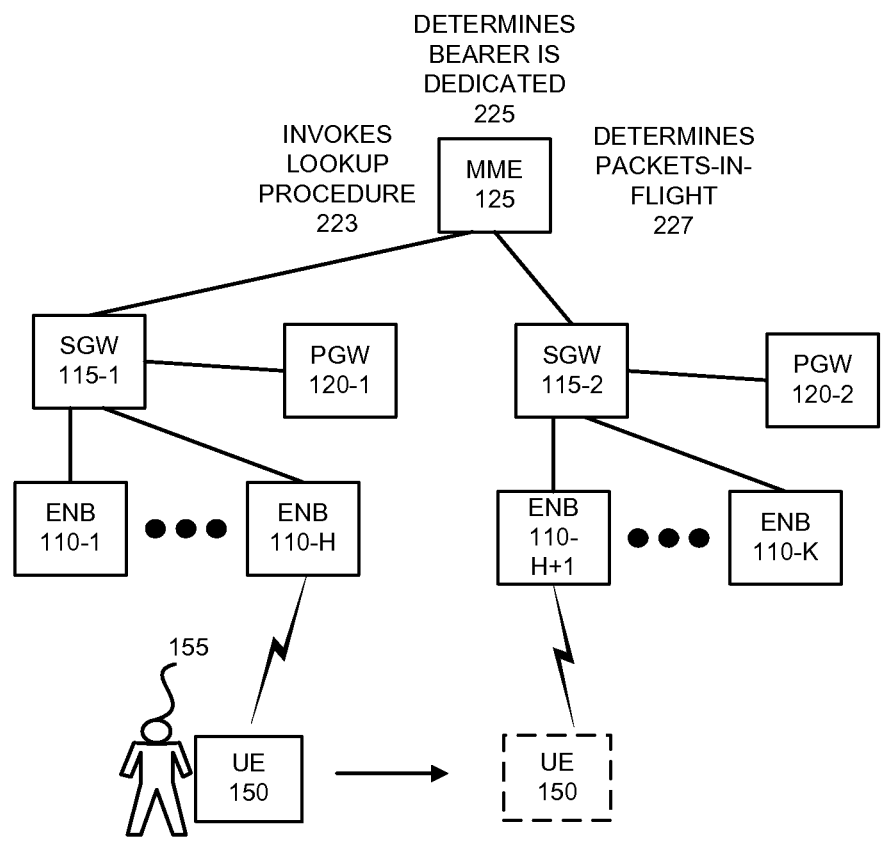
Figure 2H:
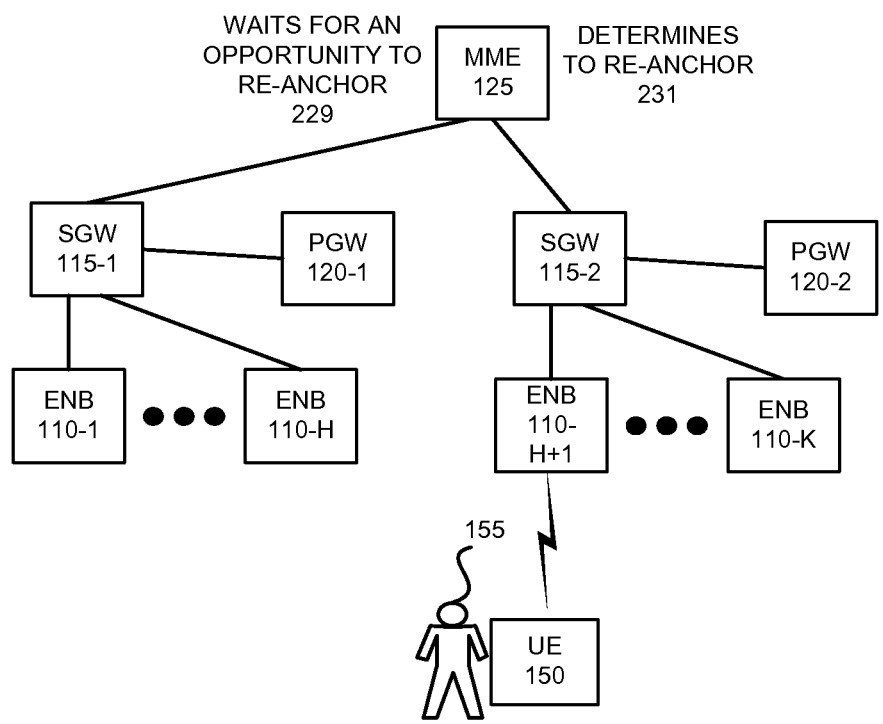

Referring to FIG. 2G, user 155/UE 150 move to another locale (e.g., a cell of eNB 110-H+1). UE 150 establishes a radio connection with eNB 110-H+1. Also assume that MME 125 receives a location update, which causes MME 125 to invoke a lookup procedure 223. MME 125 queries locale-to-PGW table 430. As a result of the lookup procedure 209, MME 125 determines to invoke a re-anchoring procedure 211 based on a comparison of PGW ID field 480 of PDN connection table 450 with PGW ID field 440 of locale-to-PGW table 430. For example, MME 125 selects PGW 120-2 as the target PGW. However, MME 125 determines that a bearer for this session includes a dedicated bearer 225 based on bearer identity field 470 of PDN connection table 450. MME 125 also accesses state data pertaining to UE 150. Based on the state data stored in field 415 of UE context table 400 (e.g., EMM registered, ECM connected, and RRC connected state), MME 125 determines that packets are in-flight 227.

Referring to Fig. H, MME 125 determines to wait for an opportunity to re-anchor 229 UE 150 to PGW 120-2. For example, MME 125 waits to receive a delete bearer request from PGW 120-1 via SGW 115-2 pertaining to the dedicated bearer of the VoLTE session. Additionally, or alternatively, MME 125 may wait for a change in state data, perform a check-again-later process, etc., as previously described. According to this example, in response to receiving the delete bearer request, MME 125 determines to re-anchor 231 the default bearer associated with the VoLTE session.

Figure 2I:
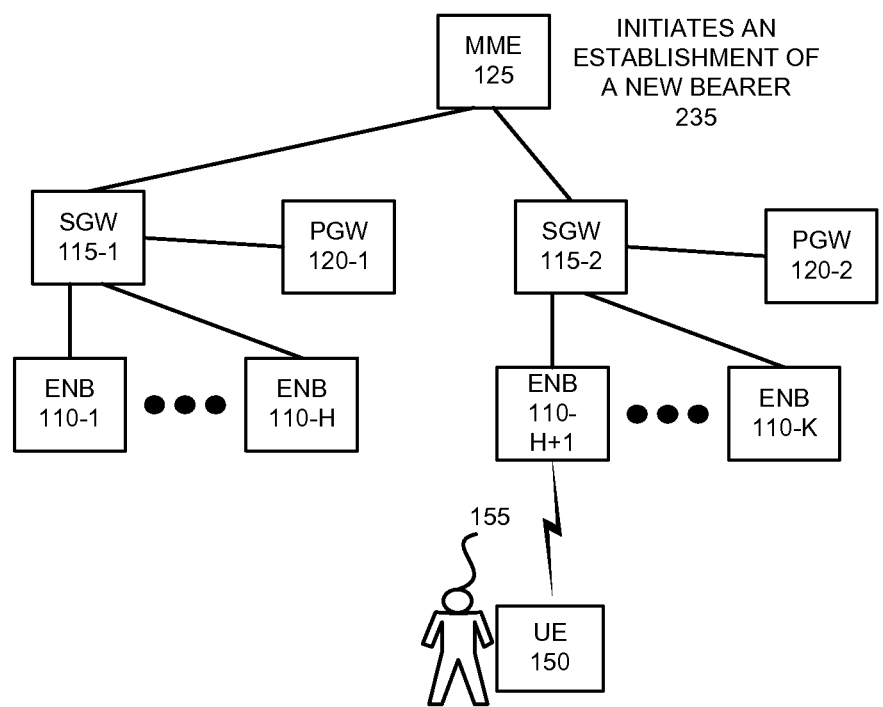
Figure 2J:
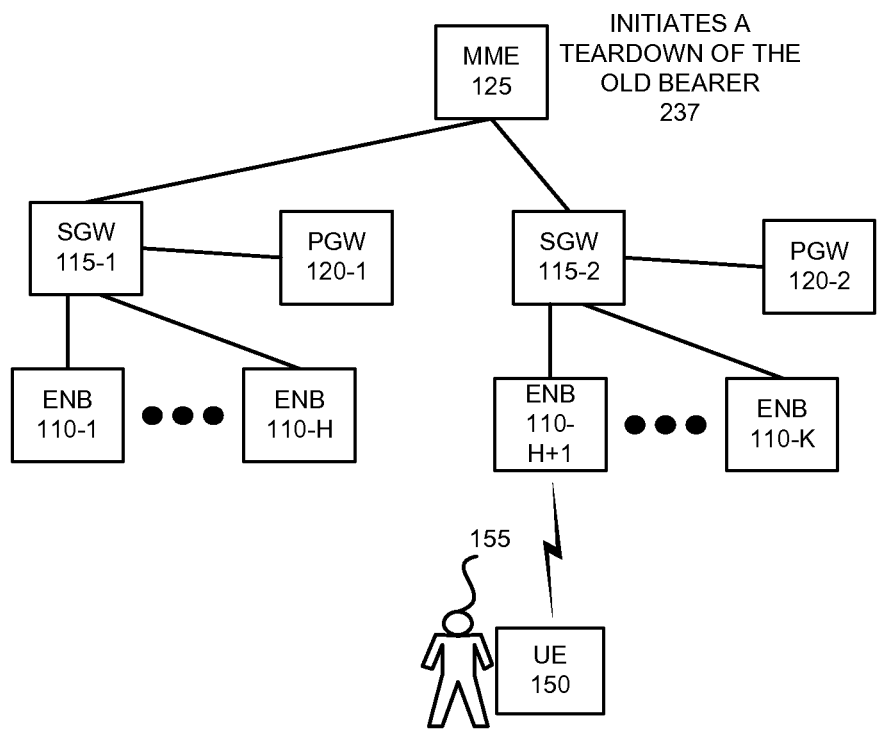

Referring to FIG. 2I, MME 125 initiates an establishment of a new default bearer 235 between UE 150 and PGW 120-2. For example, MME 125 transmits a create session request to PGW 120-2 via SGW 115-2. Referring to FIG. 2J, MME 125 initiates a teardown of the old default bearer 237 between UE 150 and PGW 120-1. For example, MME 125 transmits a delete session request to PGW 120-1 via SGW-115-2.

Figure 3:
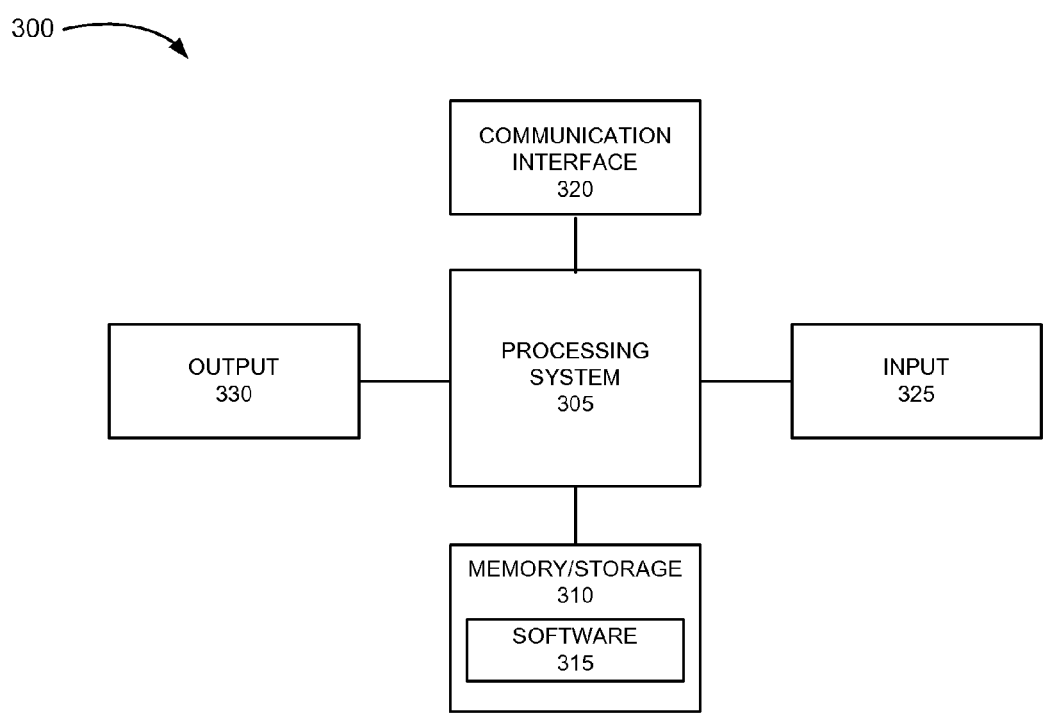
FIG. 3 is a diagram illustrating exemplary components of a device that may correspond to one or more of the devices illustrated in the exemplary environment of FIG. 1.

FIG. 3 is a diagram illustrating exemplary components of a device 300 that may correspond to one or more of the devices in environment 100. For example, device 300 may correspond to eNB 110, SGW 115, PGW 120, MME 125, HSS 130, UE 150, as well as other devices illustrated and described. As illustrated in FIG. 3, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or computer programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 310 may include a hard disk (e.g., a magnetic disk, an optical disk, a magneto-optic disk, a solid state disk, etc.) and a corresponding drive. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides a function and/or a process. Software 315 is also intended to include firmware, middleware, microcode, hardware description language (HDL), and/or other form of instruction. With reference to MME 125, software 315 includes an application that, when executed by processor 305, provides the functions of the local breakout service, as described herein. According to embodiments in which MME 125 does not store locale-to-PGW data, other network elements include an application that, when executed by processor 305, provides the functions of local breakout service, as described herein.

Communication interface 320 permits device 300 to communicate with other devices, networks, systems, and/or the like. Communication interface 320 includes one or multiple wireless interfaces and/or wired interfaces. For example, communication interface 320 may include one or multiple transmitters and receivers or transceivers. Communication interface 320 may operate according to a protocol stack and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 cause processor 305 to perform a process described herein. Alternatively, for example, according to other implementations, device 300 performs a process described herein based on the execution of hardware (processor 305, etc.).

Figure 5:
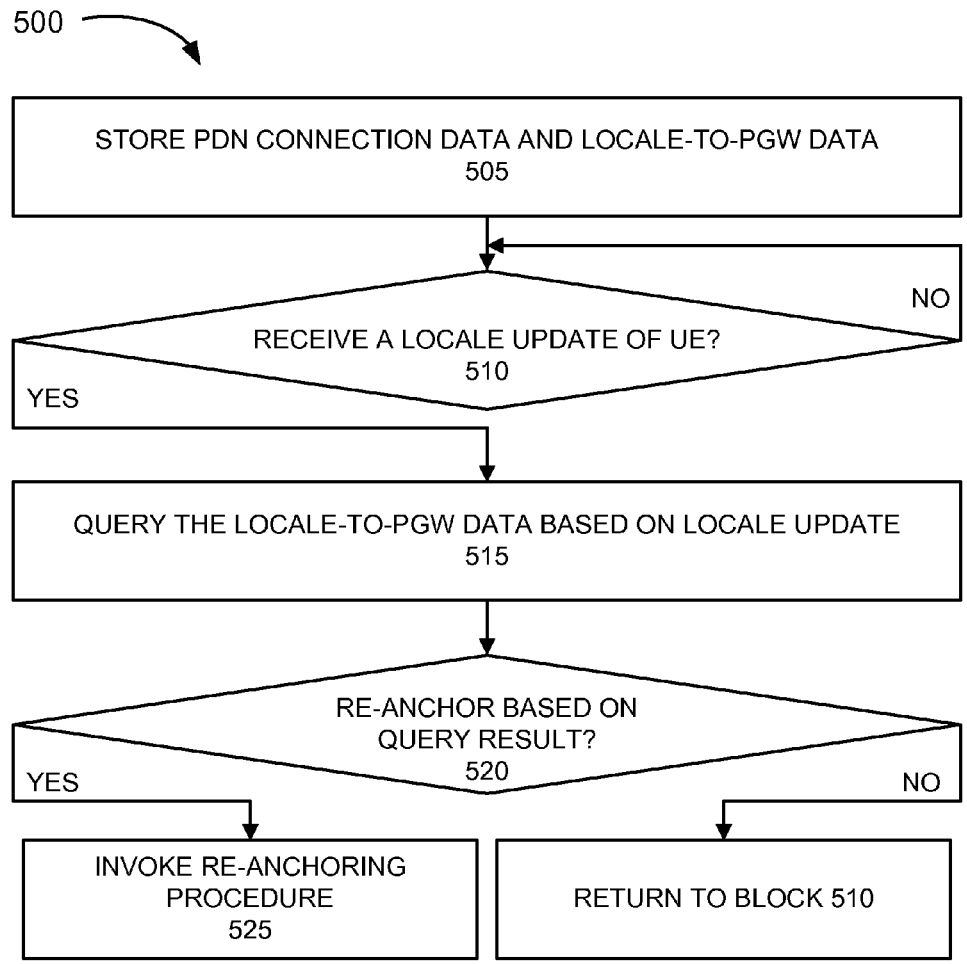
FIG. 5 is a flow diagram that illustrates an exemplary process pertaining to a lookup procedure of the local breakout service.

FIG. 5 is a flow diagram illustrating an exemplary process 500 pertaining to the lookup procedure of the local breakout service. Process 500 is directed to a process previously described above with respect to FIGS. 2A, 2B, and 2G, as well as elsewhere in this description, in which locale data pertaining to UE 150 is used to determine whether UE 150 should be re-anchored. According to an exemplary embodiment, MME 125 performs steps of process 500. For example, processor 305 executes software 315 to perform the steps described.

Referring to FIG. 5, block 505, process 500 may begin with storing PDN connection data and locale-to-PGW data. For example, MME 125 stores PDN connection data pertaining to UE 150. The PDN connection data includes a PGW identifier to which UE 150 is attached. The PDN connection data may include other data, as previously described in relation to FIG. 4C. MME 125 or another network element may store locale-to-PGW data. The locale-to-PGW data includes mappings between locales and PGW identifiers. The mappings indicate PGWs to which UEs 150 are to be attached in view of the locales. FIG. 4B illustrates an example of locale-to-PGW data.

In block 510, it is determined whether a locale update of a UE is received. For example, subsequent to attachment of UE 150, MME 125 may or may not receive a locale update from UE 150. As previously described, MME 125 may receive a locale update based on various procedures and/or messaging when UE 150 moves to a new location.

When it is determined that a locale update is not received (block 510—NO), MME 125 continues to wait for a locale update returns to block 510. When it is determined that a locale update is received (block 510—YES), MME 125 queries the locale-to-PGW data based on the new locale (block 515). For example, MME 125 queries the locale-to-PGW data to identify the PGW mapped to the new locale. MME 125 may use the new locale as a key to search the locale-to-PGW data and obtain a PGW identifier mapped to the new locale.

In block 520, it is determined whether to re-anchor the UE based on a query result. For example, MME 125 compares the PGW identifier of the locale-to-PGW data to the PGW identifier included in the PDN connection data. Based on the comparison, MME 125 determines whether the PGW identifier of the locale-to-PGW data matches the PGW identifier included in the PDN connection data.

When it is determined that the PGW identifier of the locale-to-PGW data does not match the PGW identifier included in the PDN connection data (block 520—YES), MME 125 determines that a re-anchoring procedure is to be invoked (block 525). When it is determined that the PGW identifier of the locale-to-PGW data does match the PGW identifier included in the PDN connection data (block 520—NO), MME 125 determines that a re-anchoring procedure is not to be invoked. Process 500 continues to block 510.

Although FIG. 5 illustrates an exemplary process 500 of the local breakout service, according to other embodiments, process 500 may include additional operations, fewer operations, and/or different operations than those illustrated in FIG. 5 and described. For example, when UE 150 performs a periodic TAU, MME 125 may periodically receive a locale update. Since the locale update may or may not indicate a new locale than a currently stored locale (e.g., stored as UE context data), MME 125 may compare the new locale to the currently stored locale, as previously described. When the new locale is different from the currently stored locale, process 500 continues to block 515. When the new locale is not different from the currently stored locale, MME 125 continues to wait for a locale update, as described above.

Figure 6:
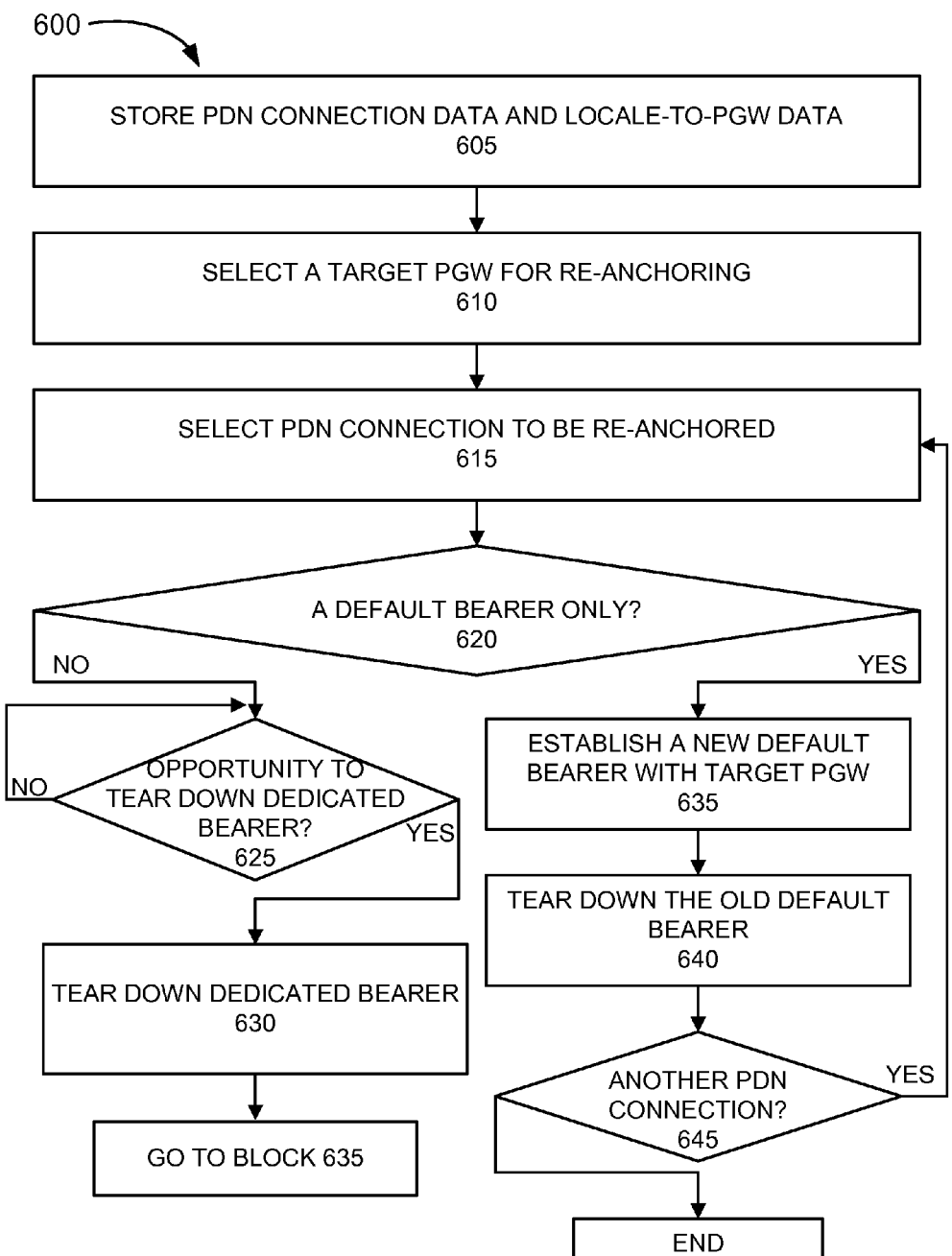
FIG. 6 is a flow diagram that illustrates an exemplary process pertaining to a re-anchoring procedure of the local breakout service.

FIG. 6 is a flow diagram illustrating an exemplary process 600 pertaining to the re-anchoring procedure of the local breakout service. Process 600 is directed to a process previously described above with respect to FIGS. 2C-2E, and 2G-2J, as well as elsewhere in this description, in which a target PGW is selected and UE 150 is re-anchored to the target PGW. According to an exemplary embodiment, MME 125 performs steps of process 500. For example, processor 305 executes software 315 to perform the steps described. Process 600 may be performed subsequent to the lookup procedure in which a determination is made that UE 150 is to be re-anchored.

Referring to FIG. 6, block 605, process 600 may begin with storing PDN connection data and locale-to-PGW data. For example, MME 125 stores PDN connection data pertaining to UE 150. The PDN connection data includes a PGW identifier to which UE 150 is attached. The PDN connection data may include other data, as previously described in relation to FIG. 4C. MME 125 or another network element may store locale-to-PGW data. The locale-to-PGW data includes mappings between locales and PGW identifiers. The mappings indicate PGWs to which UEs 150 are to be attached in view of the locales. FIG. 4B illustrates an example of locale-to-PGW data.

In block 610, a target PGW is selected for re-anchoring. For example, MME 125 selects a target PGW, which maps to the current locale of UE 150, from the locale-to-PGW data.

In block 615, a PDN connection to be re-anchored is selected. For example, MME 125 selects a PDN connection from the PDN connection data. For example, MME 125 identifies a PDN connection belonging to UE 150 based on the UE identifier (e.g., UE ID field 455). Additionally, MME 125 identifies a PDN connection that is to be re-anchored based on a PGW identifier of the current PGW (e.g., PGW ID field 480).

In block 620, it is determined whether the PDN connection includes only a default bearer. For example, MME 125 determines whether the PDN connection includes only a default bearer based on the PDN connection data (e.g., bearer identity field 470 and/or session field 475).

When it is determined that the PDN connection does not include only a default bearer (block 620—NO), it is determined whether there is an opportunity to tear down a dedicated bearer (block 625). For example, MME 125 may check the state of UE 150 (e.g., UE context data) and/or if a particular message to tear down the dedicated bearer has been received.

When it is determined that there is not an opportunity to tear down the dedicated bearer (block 625—NO), MME 125 waits for the opportunity. For example, MME 125 may perform a check-again-later process and/or wait for a particular message (e.g., a delete bearer request). Alternatively, MME 125 may return to block 615 and select another PDN connection when there are multiple PDN connections.

When it is determined that there is an opportunity to tear down the dedicated bearer (block 625—YES), MME 125 tears down the dedicated bearer (block 630). For example, MME 125 generates and transmits a delete session request to the source PGW. Alternatively, for example, MME 125 generates and transmits an E-RAB release message to eNB 110 associated with the dedicated bearer. Since the dedicated bearer is linked to a default bearer, process 600 continues to block 635, which is described below.

When it is determined that the PDN connection does include only a default bearer (block 620—YES), a new default bearer with the selected, target PGW is established (block 635). For example, MME 125 generates and transmits a create session request to the target PGW to initiate an establishment of the new default bearer.

In block 640, the old default bearer is torn down. For example, MME 125 generates and transmits a delete session request to the source PGW to initiate a tear down of the old default bearer.

In block 645, it is determined whether there is another PDN connection to be re-anchored. For example, MME 125 searches the PDN connection data to identify whether there are any PDN connections of UE 150 to be re-anchored. When there is another PDN connection (block 645—YES), process 600 continues to block 615. When there is not another PDN connection (block 645—NO), process 600 ends.

The foregoing description of embodiments provides illustration, but is not intended to be exhaustive or to limit the embodiments to the precise form disclosed. Accordingly, modifications to the embodiments described herein may be possible. For example, although environment 100 includes LTE network 105, according to other embodiments, environment 100 may not include LTE network 105. For example, a network, other than an LTE network, may include nodes that are similar (e.g., in terms of function) as MME 125, HSS 130, PGW 120, etc. of LTE network 105, and within such a network, a user device may be anchored to a particular network element. In this regard, a local breakout service may be implemented in such a network.

Depending on the network configuration and topology of LTE network, various types of handovers may occur as a result of the mobility of UE 150 and/or for other reasons. For example, an Intra-MME/SGW handover (e.g., an X2 interface-based, an S1 interface-based, or a UE measurement report-based), which includes a handover between a source eNB and a target eNB while maintaining the same SGW 115 and MME 125, may occur. Alternatively, an inter-MME handover (e.g., an S1 interface-based), which includes a handover between a source MME 125 and a target MME 125 that are connected to the same SGW 115, or involving a source SGW 115 and a target SGW 115, may occur. Still further, in some instances, there may be an inter-radio access technology (RAT) handover (e.g., E-UTRAN to UTRAN, UTRAN to E-UTRAN, etc.), which may occur. Additionally, an LTE specification may support another type of handover, not specifically mentioned herein.

In view of these exemplary handovers, the invocation and execution of the local breakout service described herein, may or may not be performed simultaneously with, serially with, or otherwise, in relation to a type of handover. Additionally, depending on the architecture deployed (e.g., centralized, distributed, combination thereof, etc.) of the network elements of an LTE network, the connections between the network elements (e.g., one-to-many, many-to-many, etc.), and/or whether a single network element (e.g., one or multiple PGWs, etc.) is implemented on a network device compared to multiple network elements (e.g., one or multiple PGWs and one or multiple SGWs, etc.) are implemented on a same network device, may impact a determination as to whether the local breakout service is invoked.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 305) of a computational device. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
    storing, by a network device, packet data network (PDN) connection data pertaining to a user equipment connected to a Long Term Evolution network;
    storing locale-to-packet data network gateway (PGW) data, wherein the locale-to-PGW data includes mappings between locales and PGWs to be used when the user equipment is located in the locales;
    receiving, by the network device, a locale update pertaining to the user equipment;
    querying, by the network device, the locale-to-PGW data in response to the receiving of the locale update;
    determining, by the network device, based on a result of the querying, whether the user equipment is to be re-anchored to a different PGW than a PGW to which the user equipment is currently anchored;
    invoking, by the network device, a re-anchoring procedure, in response to determining that the user equipment is to be re-anchored to the different PGW; and
    omitting to invoke, by the network device, the re-anchoring procedure, in response to determining that the user equipment is not to be re-anchored to the different PGW.

2. The method of claim 1, wherein the network device includes a Mobility Management Entity, and wherein the determining comprises:
    selecting, from the stored PDN connection data, an identifier of the PGW;
    selecting, from the locale-to-PGW data, an identifier of the different PGW;
    comparing, the identifier of the PGW to the identifier of the different PGW; and
    determining, based on the comparing, whether the identifier of the PGW matches the identifier of the different PGW; and wherein the invoking comprises:
    invoking, the re-anchoring procedure, in response to determining that the identifier of the PGW does not match the identifier of the different PGW.

3. The method of claim 1, wherein the re-anchoring procedure comprises:

selecting, from the locale-to-PGW data, one of the mappings based on a locale indicated by the locale update, and wherein the different PGW is mapped to the locale.

4. The method of claim 3, wherein the re-anchoring procedure comprises:
determining whether a PDN connection, which exists between the user equipment and the PGW, includes only a default bearer.

5. The method of claim 4, further comprising:
establishing a new default bearer between the different PGW and the user equipment, in response to determining that the PDN connection includes only the default bearer; and
tearing down an old default bearer between the PGW and the user equipment.

6. The method of claim 5, wherein the old default bearer has packets in flight.

7. The method of claim 3, further comprising:
determining whether a dedicated bearer can be torn down, which exists between the user equipment and the PGW, in response to determining that the PDN connection does not include only the default bearer.

8. The method of claim 7, further comprising:
receiving, by the network device, a request to tear down the dedicated bearer; and
establishing a new default bearer, in response to receiving the request, between the different PGW and the user equipment; and
tearing down an old default bearer between the PGW and the user equipment.

9. A network device comprising:
a communication interface;
a memory, wherein the memory stores instructions; and
a processor, wherein the processor executes the instructions to:
store packet data network (PDN) connection data pertaining to a user equipment connected to a Long Term Evolution network;
store locale-to-packet data network gateway (PGW) data, wherein the locale-to-PGW data includes mappings between locales and PGWs to be used when the user equipment is located in the locales;
receive, via the communication interface, a locale update pertaining to the user equipment;
query the locale-to-PGW data in response to a receipt of the locale update;
determine, based on a result of the query, whether the user equipment is to be re-anchored to a different PGW than a PGW to which the user equipment is currently anchored;
invoke a re-anchoring procedure, in response to a determination that the user equipment is to be re-anchored to the different PGW; and
omit to invoke the re-anchoring procedure, in response to a determination that the user equipment is not to be re-anchored to the different PGW.

10. The network device of claim 9, wherein the network device includes a Mobility Management Entity (MME), and wherein when determining, the processor further executes the instructions to:
select from the stored PDN connection data, an identifier of the PGW;
select from the locale-to-PGW data, an identifier of the different PGW;
compare the identifier of the PGW to the identifier of the different PGW; and
determine, based on a comparison, whether the identifier of the PGW matches the identifier of the different PGW; and wherein the invoking, the processor further executes the instructions to:
invoke the re-anchoring procedure, in response to a determination that the identifier of the PGW does not match the identifier of the different PGW.

11. The network device of claim 9, wherein the processor further executes the instructions to:
select, from the locale-to-PGW data, one of the mappings based on a locale indicated by the locale update, and wherein the different PGW is mapped to the locale.

12. The network device of claim 11, wherein when invoking the re-anchoring procedure, the processor further executes the instructions to:
determine whether a PDN connection, which exists between the user equipment and the PGW, includes only a default bearer.

13. The network device of claim 12, wherein the processor further executes the instructions to:
transmit, via the communication interface, a create session request to the different PGW, on behalf of the user equipment, in response to a determination that the PDN connection includes only the default bearer, wherein the create session request initiates an establishment of a new default bearer between the different PGW and the user equipment; and
transmit, via the communication, a delete session request to the PGW, wherein the delete session request initiates a teardown of a default bearer between the user equipment and the PGW.

14. The network device of claim 11, wherein the processor further executes the instructions to:
determine whether a dedicated bearer can be torn down, which exists between the user equipment and the PGW, in response to a determination that the PDN connection does not include only the default bearer.

15. The network device of claim 14, wherein the processor further executes the instructions to:
receive, via the communication interface, a request to tear down the dedicated bearer;
transmit, via the communication interface, a create session request to the different PGW, in response to a receipt of the request to tear down, wherein the create session request initiates an establishment of a new default bearer between the different PGW and the user equipment; and
transmit, via the communication, a delete session request to the PGW in response to a transmission of the create session request, wherein the delete session request initiates a teardown of a default bearer between the user equipment and the PGW, and wherein the default bearer has packets in flight.

16. A non-transitory, computer-readable storage medium storing instructions executable by a processor of a computational device, which when executed cause the computational device to:
store packet data network (PDN) connection data pertaining to a user equipment connected to a network;
store locale-to-packet data network gateway (PGW) data, wherein the locale-to-PGW data includes mappings between locales and PGWs to be used when the user equipment is located in the locales;
receive a locale update pertaining to the user equipment;
query the locale-to-PGW data in response to a receipt of the locale update;

determine, based on a result of the query, whether the user equipment is to be re-anchored to a different PGW than a PGW to which the user equipment is currently anchored; and invoke a re-anchoring procedure, in response to a determination that the user equipment is to be re-anchored to the different PGW.

17. The non-transitory, computer-readable storage medium of claim 16, wherein the instructions to determine further include instructions to:

select from the stored PDN connection data, an identifier of the PGW;

select from the locale-to-PGW data, an identifier of the different PGW;

compare the identifier of the PGW to the identifier of the different PGW; and determine, based on a comparison, whether the identifier of the PGW matches the identifier of the different PGW; and wherein the instructions to invoke further include instructions to:

invoke the re-anchoring procedure, in response to a determination that the identifier of the PGW does not match the identifier of the different PGW.

18. The non-transitory, computer-readable storage medium of claim 17, further storing instructions executable by the processor of the computational device, which when executed cause the computational device to:

select, from the locale-to-PGW data, one of the mappings based on a locale indicated by the locale update, and wherein the different PGW is mapped to the locale.

19. The non-transitory, computer-readable storage medium of claim 18, further storing instructions executable by the processor of the computational device, which when executed cause the computational device to:

determine whether a PDN connection, which exists between the user equipment and the PGW, includes only a default bearer;

transmit a create session request to the different PGW, on behalf of the user equipment, in response to a determination that the PDN connection includes only the default bearer, wherein the create session request initiates an establishment of a new default bearer between the different PGW and the user equipment; and transmit a delete session request to the PGW, wherein the delete session request initiates a teardown of a default bearer between the user equipment and the PGW.

20. The non-transitory, computer-readable storage medium of claim 18, further storing instructions executable by the processor of the computational device, which when executed cause the computational device to:

determine whether a PDN connection, which exists between the user equipment and the PGW, includes only a default bearer;

determine whether a dedicated bearer can be torn down, which exists between the user equipment and the PGW, in response to a determination that the PDN connection does not include only the default bearer; and transmit a create session request to the different PGW, in response to a receipt of a request to tear down the dedicated bearer, wherein the create session request initiates an establishment of a new default bearer between the different PGW and the user equipment.

* * * * *